United States Patent Office 3,576,886
Patented Apr. 27, 1971

3,576,886
ISOMERIZATION OF MEDIUM RING CYCLIC ALIPHATIC EPOXIDES
Ming Nan Sheng, Cherry Hill, N.J., and John G. Zajacek, Strafford, Pa., assignors to Atlantic Richfield Company, Philadelphia, Pa.
No Drawing. Filed Mar. 22, 1968, Ser. No. 715,204
Int. Cl. C07c 35/20, 55/04
U.S. Cl. 260—617                                  3 Claims

ABSTRACT OF THE DISCLOSURE

Method for the isomerization of cyclic aliphatic epoxides having from 7 to 10 carbon atoms in the ring by contacting the epoxide with lithium orthophosphate or potassium tertiary butoxide at elevated temperatures to produce the corresponding allylic alcohol.

BACKGROUND OF THE INVENTION

Field of the invention

This invention relates to the isomerization of cyclic aliphatic epoxides having from 7 to 10 carbon atoms in the molecule to produce the corresponding allylic alcohol by the use of either lithium orthophosphate or potassium tertiary butoxide as the catalyst.

Prior art

It has been found that base-catalyzed rearrangement of acyclic aliphatic and large ring epoxides give allylic alcohols as the major rearrangement products, see A. C. Cope et al., J. Am. Chem. Soc. 87 3125 (1965) and H. Nazaki et al., Tetrahedron 22 1207 (1966). It has been shown by deuterium-abelling studies that this rearrangement follows a beta-elimination mechanism to give the allylic alcohols.

It was reported by A. C. Cope et al., J. Am. Chem. Soc. 80 2849 (1958), however, that isomerization of medium ring epoxides, i.e. cyclic aliphatic epoxides having from 7 to 10 carbon atoms in the ring followed the alpha-elimination mechanism to produce bicyclic compounds, for example, if lithium diethylamide is utilized as the catalyst for isomerization of cyclooctene oxide, there is produced a cis-2-bicyclo[3,3,0]octanol as the major product rather than the allylic alcohol which would be produced if the mechanism were one of beta-elimination. This is also shown by Cope et al. in the article in J. Am. Chem. Soc. 82 6370 (1960).

In accordance with the present invention it has been found that, contrary to the previous work in this field, it is possible to isomerize medium ring epoxides solely to allylic alcohols, i.e. that a beta-elimination mechanism is possible to attain by the method of this invention.

SUMMARY OF THE INVENTION

In accordance with this invention medium ring epoxides, i.e. cyclic aliphatic epoxides having from 7 to 10 carbon atoms in the ring can be isomerized solely to the corresponding allylic alcohol by contacting with either a lithium orthophosphate catalyst or a potassium tertiary butoxide catalyst at temperatures ranging from about 80° C. to 250° C.

It is an object of this invention therefore to provide a method for the isomerization of cyclic aliphatic epoxides having from 7 to 10 carbon atoms in the ring to produce the corresponding allylic alcohol.

It is another object of this invention to provide a method for the isomerization of cyclic aliphatic epoxides having from 7 to 10 carbon atoms in the ring to the corresponding allylic alcohols utilizing a lithium phosphate catalyst.

It is another object of this invention to provide a method for the isomerization of cyclic aliphatic epoxides having from 7 to 10 carbon atoms in the ring to the corresponding allylic alcohols utilizing a potassium tertiary butoxide catalyst.

Other objects of this invention will be apparent from the following description of the preferred embodiments and from the claims.

DESCRIPTION OF THE PREFERRED EMBODIMENTS

The monoepoxides which can be isomerized in accordance with this invention are the cyclic aliphatic compounds having 7 to 10 carbon atoms in the ring and which may contain additional unsaturation or other substituents. Examples are cycloheptene oxide, cyclooctene oxide, cyclononene oxide, cyclodecene oxide, the cycloheptadiene monoepoxides, the cyclooctadiene monoepoxides, and the like. It is necesary of course that such compounds have a hydrogen atom on the carbon atom in the beta position to the epoxide in order to have the beta-elimination mechanism and thus the allylic alcohol produced. The preferred compounds are cyclooctene oxide, and cyclooctadiene monoepoxide. The cyclooctene oxide is represented by the formula

and the cyclooctadiene monoepoxides are represented by the formulas

and

i.e. 1,2-epoxy-5-cyclooctene and 1,2-epoxy-3-cyclooctene, respectively.

Thus, it will be seen from the foregoing description that the monoepoxides which can be isomerized in accordance with this invention are the monoepoxides of cycloalkenes and the cycloalkadienes having from 7 to 10 carbon atoms in the ring and having a hydrogen atom on the carbon atom in the beta position to the epoxide group.

The lithium orthophosphate catalysts which can be utilized in this invention are disclosed in U.S. Pats. Nos. 2,986,585 (1961) to Denton and 3,255,258 (1961) to Charles et al. The lithium phosphate catalyst utilized in the examples hereinafter was prepared by the following procedure:

A solution of lithium hydroxide was prepared by dissolving 126 grams (3 moles) of the monohydrate in 500 cc. of distilled water. A solution of sodium orthophosphate was prepared by dissolving 570 grams (1.5 moles) of the dodecahydrate in 750 cc. of distilled water and the solution was warmed to about 40° C. The latter solution was added in one or two minutes to the first, during agitation, and resulted in the formation of a precipitate at a pH of 12 to 14. The precipitate was filtered and washed and was then dispersed in about 1.5 to 2 liters of distilled water at a temperature about 95° C. After thorough agitation of the suspension for ten to thirty minutes, the precipitate was again filtered and washed. The leaching with excess hot distilled water and filtration was repeated four more times, the final leaching solution having a pH of 10 to 11. The filter cake was dried for 16 hours in an oven at 200° C. and the catalyst was prepared for use by subdividing into pieces of about 4 to 12 mesh.

The potassium tertiary butoxide is a commercially available material and this was employed in the examples of this invention. The lithium orthophosphate catalyst can be used either in suspension or in a fixed bed at temperatures of from 150° C. to 250° C. preferably. If desired a solvent such as benzene can be used. With the potassium tertiary butoxide, liquid phase is preferable and temperatures of from 80° C. to 100° C. are preferred.

The lithium orthophosphate catalyst can also be used as a suspension instead of a fixed bed. The quantity of catalyst employed is not critical since the lithium orthophosphate can be reused. The potassium tertiary butoxide is preferably used in amounts (molar) equal to the epoxide in order to obtain good contact. This is not critical, however, since smaller or larger amounts may be used.

The following examples are provided to illustrate specific embodiments of the invention but these are not to be construed as limiting the invention solely thereto.

Example I

Preparation of 1,2-epoxy-5-cyclooctene.—A solution of 0.1 gram molybdenum hexacarbonyl, 48 gram (0.5 mole) 94 percent t-butyl hydroperoxide, and 108 grams (1 mole) 1,5-cyclooctadiene was placed in a 500 ml. three-neck flask equipped with a water condenser, a thermometer, and a mechanical stirrer. The solution was heated at 80° C. for 1 hour. After the reaction had cooled to room temperature, the product was collected in a 500 ml. flask. The t-butanol was removed on a flash-evaporator. The liquid residue was fractionally distilled under reduced pressure. 1,2-epoxy-5-cyclooctene was collected at 70–72° (10 mm.), the yield was 46 grams (80 percent).

Isomerization of 1,2-epoxy-5-cyclooctene with lithium orthophosphate catalyst.—A 3″ by 5″ column was packed with the lithium orthophosphate pellets prepared as described above. This column was surrounded by a heating coil in order to maintain the desired reaction temperature. A solution of 5 grams of 1,2-epoxy-5-cyclooctene prepared as described in the first part of this example dissolved in 5 grams of benzene was passed downwardly through the catalyst chamber, nitrogen being used to push the epoxide through the catalyst. A reaction temperature of 194° C. was employed and a flow rate of 10 grams per 95 minutes was used. A portion amounting to 1.1 grams was collected as the first or pre-run fraction and another portion of 7.6 grams was collected as the second or run fraction. Gas chromatographic analysis showed that 96 percent of the product was 2,5-cyclooctadien-1-ol. This example shows that only the allylic alcohol is formed by using the method of this invention.

Example II

Preparation of cyclooctene oxide.—The reaction was carried out according to the procedure in Example I utilizing cyclooctene instead of cycloctadiene. Cyclooctene oxide was collected at 67–69° (9.8 mm.) (M.P. 56–57° C.), the yield was 54 g. (93 percent).

Isomerization of cyclooctene oxide with lithium orthophosphate.—The isomerization reaction was carried out like that in Example I except that the cyclooctene oxide was substituted for the 1,2-epoxy-5-cyclooctene. Gas chromatographic analysis showed that the product contained 87 weight percent 2-cycloocten-1-ol, 8 percent unidentified by-products and 5 percent unreacted epoxide. There was no bi-cyclic alcohol however. This example shows that the isomerization of a medium ring epoxide can be carried out to produce the corresponding allylic alcohol by the method of this invention.

Example III

Hydrogenation of the 2,5-cyclooctadien-1-ol prepared in Example I.—A solution of 5 grams of 2,5-cyclooctadien-1-ol in 100 ml. of absolute alcohol was hydrogenated with excess hydrogen in the presence of 0.2 gram of platinum oxide in a Parr shaker. The reaction was completed in about 25 minutes and the alcohol was removed by the flash evaporation. The residue was identified as cyclooctanol by infrared spectrographic analysis, nuclear magnetic resonance analysis and elemental analysis. The cyclooctanol also had the same gas chromatographic retention time as an authentic sample. This proved the structure of the original compound.

A similar hydrogenation was carried out on the 2-cycloocten-1-ol prepared in Example II. Again the product was identified as cyclooctanol.

Example IV

Isomerization of cyclooctene oxide with potassium t-butoxide.—A solution of 17.6 g. (0.14 mole) cyclooctene oxide and 16.2 g. (0.14 mole) potassium t-butoxide in 140 ml. anhydrous dimethyl sulfoxide was heated under nitrogen at 80° C.–83° C. for 22 hours. The solution was cooled at room temperature. To this solution 5 ml. of water were added and sufficient powdered Dry Ice to neutralize the solution. It was filtered and washed with t-butanol. The t-butanol in the filtrate was removed on a flash-evaporator. The residue was dissolved in 300 ml. of water, and was extracted with 3 portions of 150 ml. n-pentane. The organic layer was dried overnight over anhydrous magnesium sulfate. After the n-pentane was removed under vacuum the residue (9.1 grams) was analyzed by gas chromatographic analysis. It contained 88 weight percent 2-cycloocten-1-ol, 7 weight percent of a by-product not identified but which was not a bi-cyclic alcohol and 5 percent unreacted epoxide.

Example V

Isomerization of cyclooctene oxide with N-lithium diethyl amide.—To an ice-cold solution of 18.3 g. (0.25 mole) diethylamine (dried over KOH) in 100 ml. anhydrous ether were added 107 g. (0.25 mole) commercial 15 percent n-butyl lithium in hexane under nitrogen. After 10 minutes, a solution of 12.6 grams (0.1 mole) cyclooctene oxide in 100 ml. of anhydrous ether was added, and the mixture heated to reflux for 2 days. The reaction mixture was cooled and poured into ice-water and the organic layer separated. The aqueous layer was extracted with ether and the combined organic layers were washed with 1 N hydrochloric acid, saturated sodium bicarbonate solution and water. After drying over anhydrous magnesium sulfate, the solvent was removed by distillation under vacuum. The residue (9.9 g.) was analyzed by gas chromatography. It contained two products. The major product was bicyclo (3,3,0)octan-2-ol (80 percent) and the minor product was 2-cycloocten-1-ol (20 percent). They were identified by nuclear magnetic resonance spectra. The total yield for the two products was 75 percent. This example which utilizes a catalyst of the prior art shows that the catalysts of this invention are unique for the production of the allylic alcohols.

The unique properties of the catalysts of this invention were further demonstrated by the fact that numerous other catalysts of the prior art, for example, lithium tertiary butoxide do not give the rearrangement to allylic alcohols.

The allylic alcohols made in accordance with the method of this invention have a wide variety of uses as chemical intermediates, for example the 2,5-cyclooctadien-1-ol or the 2-cycloocten-1-ol prepared as in Examples I and II can be hydrogenated as described in Example III and thereafter oxidized in two steps by conventional methods to suberic acid which is utilized in reactions with diamines to produce nylon fibers. In general the allylic alcohols produced in accordance with this invention undergo the same reactions as aliphatic allylic alcohols.

As many possible embodiments can be made of this invention without departing from the broad scope thereof, it is to be understood that all matter herein set forth is to be interpreted as illustrative and not as unduly limiting the invention.

We claim:

1. A method for the isomerization of a member of the group consisting of the monoepoxides of cycloalkenes and cycloalkadienes having from 7 to 10 carbon atoms in the molecule and having a hydrogen atom on the carbon atom in the beta position to the epoxide group which comprises contacting an anhydrous dimethyl sulfoxide solution of the epoxide at a temperature of about 80° to 100° C. with about 1 mole of potassium tertiary butoxide per mole of said epoxide to produce the corresponding allylic alcohol.

2. The method according to claim 1 wherein the monoepoxide is cyclooctene oxide.

3. The method according to claim 1 wherein the monoepoxide is 1,2-epoxy-5-cyclooctene.

References Cited

UNITED STATES PATENTS

| | | | |
|---|---|---|---|
| 2,426,264 | 8/1947 | Fowler et al. | 260—632B |
| 2,660,609 | 11/1953 | Robeson et al. | 260—632B |

FOREIGN PATENTS

| | | | |
|---|---|---|---|
| 877,139 | 9/1961 | Great Britain | 260—632B |

OTHER REFERENCES

Nozski et al.: "Tetrahydron," vol. 22 (1966), pp. 1207–1212.

Cope et al.: "J. Am. Chem. Soc.," vol. 80 (1958), pp. 2849–52.

Cope et al.: "J. Am. Chem. Soc.," vol. 82 (1960), pp. 6370–72.

LEON ZITVER, Primary Examiner

J. E. EVANS, Assistant Examiner

U.S. Cl. X.R.

260—348.5, 537